W. F. KIESEL, Jr.
CURTAIN FASTENER FOR VESTIBULE CARS.
APPLICATION FILED NOV. 2, 1908.

915,358.

Patented Mar. 16, 1909.

WITNESSES:
M. E. Verbeck.

INVENTOR
William F. Kiesel, Jr.
BY
Eugene Diven
ATTORNEY

UNITED STATES PATENT OFFICE.

WILLIAM F. KIESEL, JR., OF ALTOONA, PENNSYLVANIA.

CURTAIN-FASTENER FOR VESTIBULE-CARS.

No. 915,358.   Specification of Letters Patent.   Patented March 16, 1909.

Application filed November 2, 1908. Serial No. 460,600.

*To all whom it may concern:*

Be it known that I, WILLIAM F. KIESEL, Jr., a citizen of the United States, residing at Altoona, in the county of Blair and State of Pennsylvania, have invented certain new and useful Improvements in Curtain-Fasteners for Vestibule-Cars, of which the following is a specification.

This invention relates to improvements in the fastening devices by which a vestibule curtain, which is attached to a spring roller fastened upon the door frame of one car, is secured in position on the door frame of the next car, when pulled across the bellows and diaphragm which form the vestibule between the cars; my object being to provide a simple and effective device of this character, whereby the loop attached to the free end of the curtain may be readily secured in position when the cars are coupled together; and whereby the loop will be automatically released to prevent the rupture of the curtain, should the cars become separated, from any cause, before the curtain has been released.

I attain my object by constructing the fastener in the manner illustrated in the accompanying drawings, in which—

Figure 1:
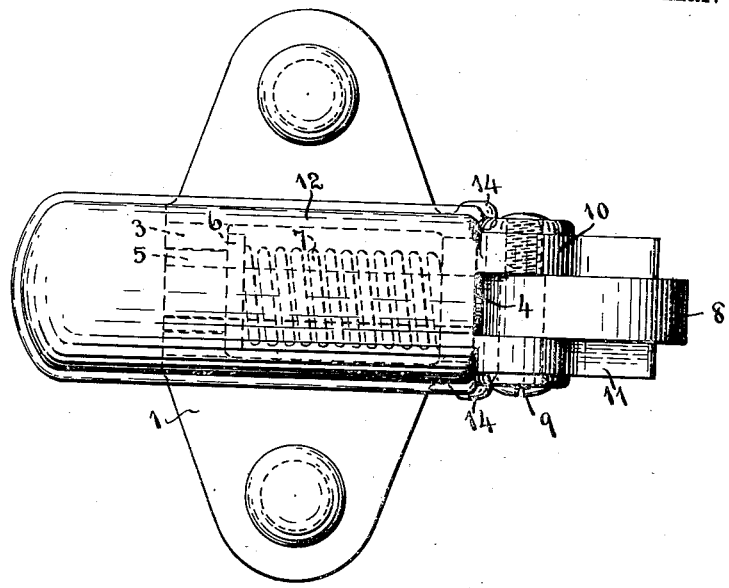
Figure 2:
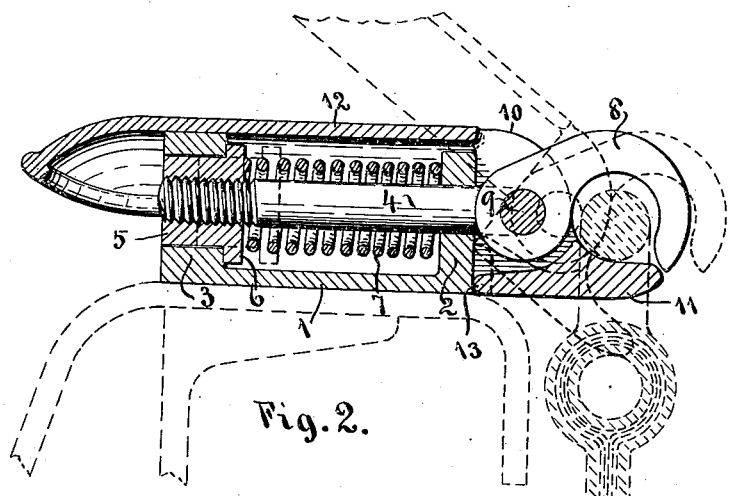
Figure 3:
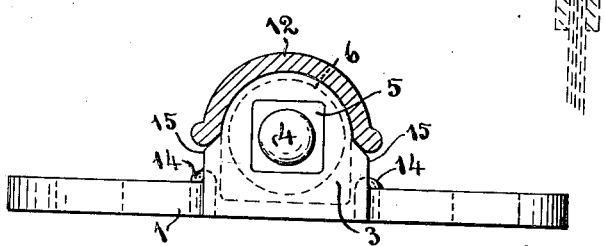

Figure 1 represents a side elevation of the fastener; Fig. 2, a longitudinal section thereof; and Fig. 3, an end view with the latch lever shown sectioned on a line with the rear face of the bracket.

Like numerals designate like parts in the several views.

The fastener comprises a support or bracket 1, adapted to be riveted or otherwise fastened to the inward side of the door frame of a car vestibule, as indicated in Fig. 2. At opposite sides of the bracket there are outward projections 2 and 3, the projection 2 being provided with a hole through which the bolt 4 passes, and the projection 3 being provided with a squared opening to receive the nut 5, into which the end of the bolt is screwed. This nut is provided with an annular head 6, on the inside of the projection 3, and a spring 7 surrounds the bolt between the projection 2 and this annular head 6, to hold the bolt normally in retracted position.

At its outward end, the bolt is provided with a hook 8. This hook is passed through a slot in a latch-piece 10, which is coupled to the bolt by means of the pin 9. This latch-piece has a forward projection 11, which closes the opening of the hook 8, thus forming two separable jaws, by which the loop of the vestibule curtain is held in place, as indicated by the broken lines in Fig. 2. The latch-piece is also provided with a lever 12, which projects backward across the bracket and is longitudinally concaved to inclose the spring and bolt. This lever is carried sufficiently beyond the projection 3 to permit it to be grasped, when opening the fastener by hand.

At 13, the latch-piece is fulcrumed against the face of the projection 2 on the bracket, and when the latch-piece is turned on its pivot connection with the hook 8, this fulcrum 13 rides out on the face of the projection 2, and forces the pivot-pin 9 and the hook outward against the tension of spring 7. The jaws of the fastener are thus separated, as shown in the broken line positions thereof in Fig. 2, permitting the loop of the curtain to be inserted in or released from the fastener.

When the latch lever 12 is thrown back into normal position, the fastener will be locked against opening under ordinary strains on the curtain; but, should undue tension occur in the curtain, as when the cars become separated, the latch-piece will be opened against the tension of spring 7, thereby automatically releasing the curtain loop.

When in open position, the latch-piece is prevented from turning the bolt in the bracket by means of guide lugs 14, formed at the outward edges of the projection 2. The bracket is also preferably provided with side walls between the projections 2 and 3, which rise, as shown at 15 in Fig. 3, to meet the sides of the latch lever 12, thereby forming a complete inclosure for the spring and bolt when the fastener is in normal position.

Having thus described the construction and operation of my fastener, and without confining myself to the particular arrangement of parts, as herein described, what I claim as my invention and desire to secure by Letters Patent is—

1. A vestibule curtain-fastener comprising a hook, a latch-piece coupled to the hook and adapted to close the opening of the hook and means for yieldingly holding the latch-piece in closed position upon the hook.

2. A vestibule curtain-fastener comprising a bolt susceptible of longitudinal movement in a support, a hook at one end of the bolt, a latch-piece coupled to the hooked end of the bolt and adapted to close the opening of the hook, said latch-piece being fulcrumed on the support to move the bolt outward when turned to open position, and means for yieldingly holding the bolt in retracted position.

3. A vestibule curtain-fastener comprising a support having guideways at opposite sides thereof, a bolt passing freely through one of said guideways, a nut on one end of the bolt adapted to slide in the other guideway, a coiled spring surrounding the bolt between said nut and the first guideway, a hook on the projecting end of the bolt, a latch-piece coupled to the hooked end of the bolt and adapted to close the opening of the hook, said latch-piece being fulcrumed on the support to move the bolt outward when turned to open position, and a lever on the latch-piece for operating the fastener by hand.

4. A vestibule curtain-fastener comprising a bolt susceptible of longitudinal movement in a support, a hook at one end of the bolt, a latch-piece coupled by a pivot-pin to the hooked end of the bolt and adapted to close the opening of the hook, said latch-piece having a fulcrum in sliding engagement with the support to move the bolt outward when turned to open position, and means for yieldingly holding the bolt in retracted position.

In testimony whereof I have affixed my signature, in presence of two witnesses.

WILLIAM F. KIESEL, Jr.

Witnesses:
J. C. Storm,
J. Foster Meck.